Dec. 4, 1923.
T. M. COFFMAN
SEPARATING DEVICE
Filed July 5, 1922
1,475,985
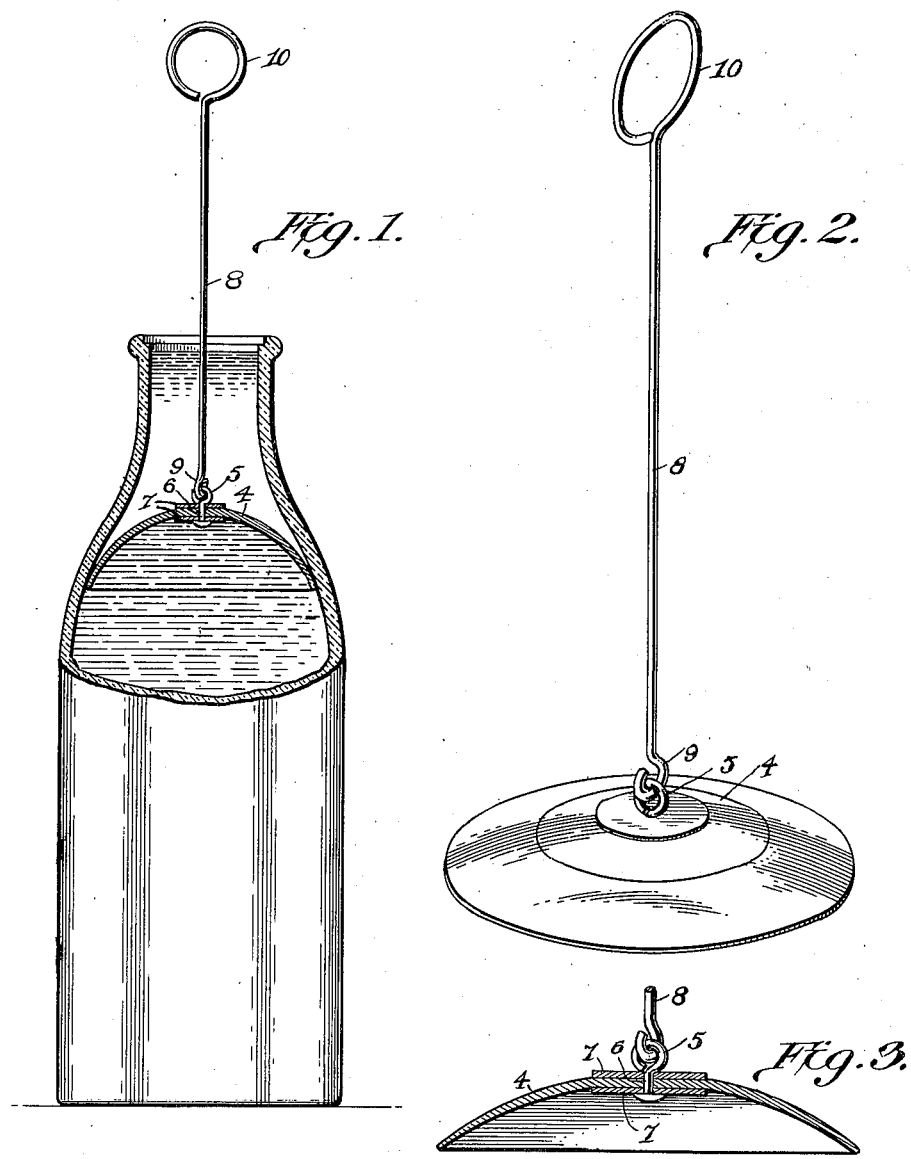

Patented Dec. 4, 1923.

1,475,985

UNITED STATES PATENT OFFICE.

THOMAS M. COFFMAN, OF RIALTO, CALIFORNIA, ASSIGNOR OF ONE-HALF TO W. J. RICKERMAN, OF RIALTO, CALIFORNIA.

SEPARATING DEVICE.

Application filed July 5, 1922. Serial No. 572,987.

*To all whom it may concern:*

Be it known that I, THOMAS M. COFFMAN, a citizen of the United States, residing at Rialto, in the county of San Bernardino and State of California, have invented certain new and useful Improvements in Separating Devices, of which the following is a specification.

The present invention relates to means for separating liquids or other materials or segregating one portion thereof from another, and while particularly intended for acting as a barrier between the milk and cream in an ordinary milk bottle, is obviously not limited to that particular use.

The object is to provide a simple structure that may be readily positioned and will act as an effective dam against the flow of one liquid or portion thereof, while permitting the ready discharge of the other, the device moreover being adaptable to containers of varying contour and adjustable within the same to any desired point of position.

In the accompanying drawings:—

Figure 1 is a view partly in elevation and partly in section of a milk bottle showing the separator in place.

Figure 2 is a perspective view of the separator,

Figure 3 is a detail sectional view of a portion of the same.

In the embodiment disclosed the separator comprises a flexible concavo-convex disk 4 preferably made of rubber or other flexible material, and curving downwardly. In other words, the convex face is the upper face. This disk tapers in thickness from its central portion to its periphery. An eye 5, arranged centrally over the disk, has a shank 6 that passes axially therethrough, and washers 7 are preferably placed on opposite sides of the disk, forming securing means for the eye element.

A handle shank 8 has a terminal eye 9 engaged in the eye 5, and may be provided with a finger loop 10 at its upper end.

In using the device, for example, in a milk bottle, the disk is collapsed and passed edgeways into the liquid. It is then allowed to expand and is drawn upwardly to the line of division between the milk and cream, as indicated in Figure 1. Its margins will obviously hug the walls of the container, and because of its concavo convex form the body of liquid behind it will tend to hold the margins tightly against the walls when the bottle or container is tipped to pour out the superposed cream.

The central connection of the handle stem to the concavo-convex disk is important, as it insures the proper positioning of the disk, as indicated in Figure 1.

It will be evident that this device is not limited to the separation of milk and cream, but may be employed for other purposes.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention what I desire to secure by Letters Patent, is:—

1. A separator comprising a flexible disk having a central portion of uniform thickness and having its margin thinned gradually by reducing its upper portion uniformly to the edge, reinforcing means for the central portion of the disk, retaining means passing through the reinforcing means and through the disk and provided with an eye at the center of the disk, and a handle stem pivotally connected with said eye.

2. A separator comprising a flexible concavo-convex disk having a central portion of uniform thickness and its marginal portion thinned gradually from said central portion to the edge, reinforcing means on both sides of the central portion of the disk, retaining means passing through the reinforcing means and through the disk and provided with an eye at the center of the disk, and a handle stem pivotally connected with the said eye.

In testimony whereof, I affix my signature in the presence of two witnesses.

THOMAS M. COFFMAN.

Witnesses:
  RAYMOND E. HODGE,
  W. J. RICKERMAN.